N. E. GEE.
STOKER.
APPLICATION FILED JULY 31, 1908.

1,082,419.

Patented Dec. 23, 1913.

N. E. GEE.
STOKER.
APPLICATION FILED JULY 31, 1908.

1,082,419. Patented Dec. 23, 1913.
13 SHEETS—SHEET 12.

WITNESSES
INVENTOR
Norman E. Gee
BY
Attorneys

UNITED STATES PATENT OFFICE.

NORMAN E. GEE, OF ALTOONA, PENNSYLVANIA.

STOKER.

1,082,419.	Specification of Letters Patent.	Patented Dec. 23, 1913.

Application filed July 31, 1908. Serial No. 446,291.

*To all whom it may concern:*

Be it known that I, NORMAN E. GEE, a citizen of the United States, residing at Altoona, in the county of Blair and State of Pennsylvania, have invented certain new and useful Improvements in Stokers, of which the following is a specification.

This invention contemplates certain new and useful improvements in mechanical stokers, and relates more particularly to that type of apparatus which is specially adapted for use in connection with modern locomotives with wide fire boxes.

Locomotive designers have been forced to provide larger boilers with more heating surface and in consequence more grate area. The length of the fire box was first increased until it became almost beyond human endurance for firemen to keep locomotives hot on heavy grades with long trains. An increase in tonnage meant more power from the locomotive and more grate area, a harder forcing of fires and more coal to be handled by the fireman until at present the size of the grate is such that some mechanical means is necessary to do the work heretofore accomplished only by the strongest and most skilled fireman.

The first object to be attained with automatic stoking of locomotives is to get the fuel from the fuel supply in the tender to the stoker on the locomotive, while the second object to be attained is the proper distribution of this fuel over the surface of the grate in the locomotive fire box.

It has been observed by locomotive firemen, that locomotives, when working on heavy grades and pulling long trains, will burn their fires unevenly over the surface of the grate, the same type and class of locomotive while working under the same conditions will likewise show a different depth of fire on the surface of its grate and probably at points the fire will be cut through, and it is the primary object of this invention to provide an apparatus that will take the coal from the coal supply and place it on the surface of the grate at the will of the operator, whereby an ample and constant supply of fuel, may always be maintained at any point on the grate in order to attain the most perfect combustion and maintain a high and uniform steam pressure in the locomotive boiler.

One of the distinctive objects of the present invention is to provide a general and practical structural improvement in the type of stoker disclosed in my former Patent No. 847,174, dated March 12, 1907, and particularly in reference to the means for feeding fuel to the stoking mechanism proper. In this connection, the present invention provides what may be termed an underfed stoker, that is, one in which the fuel is fed into the stoking mechanism proper at the underside and from a point beneath the deck of the locomotive cab, thus contributing in a very necessary and practical manner to the carrying out of the above stated object of a stoker occupying a non-interfering position in the cab.

A further object is to provide a simple and efficient means for receiving the fuel from the feeding apparatus and delivering the same to the distributing apparatus or stoking mechanism proper, and further to so arrange the feeding apparatus, the stoking mechanism, and the apparatus for transferring the fuel from the former to the latter, that they operate synchronously, successively, and in time with each other, all being controlled from a single point by the operator.

A further object is to provide an oscillating distributing head and means for automatically reversing the movement of the same.

Another object is to provide an adjustable hood or deflector for the delivery end of said distributing head, whereby the fuel may be guided as it is delivered.

A further object is to provide means for utilizing the slack coal as well as the lumps, and also to reduce to a minimum the amount of cold air that enters the fire box above the grate and thereby protect the flue sheets from cracking, and, furthermore, to promote complete combustion through the synchronous action of the controlling valve and deflector plate, all of which provide means whereby an even and high pressure can be carried in locomotive boilers, thus reducing the strains that arise in boilers from changes in temperature.

The invention will be hereinafter set forth and particularly pointed out in the claims.

The essential features of the invention involved in carrying out the objects above indicated, are necessarily susceptible to a wide range of structural modification without departing from the spirit of my invention.

A practical embodiment thereof, however, is illustrated in the accompanying drawings, in which:

Fig. 3ª is an enlarged top plan view of the stoking mechanism proper.

Referring to the drawings, 40 designates the cab of a locomotive, and 41 the tender thereof, both being illustrated in dotted lines. The fire box 43 is provided with a fire door opening 44 which serves the fireman in making the fire, and as a means of hand firing should the latter become necessary or desirable; and also as a means of access to the grates for any purpose. The boiler and other fittings are those usual with any standard locomotive.

The fuel conveyer is located under the false deck plates of the locomotive and tender and comprises a trough 45 preferably provided with two compartments 46, 46 in each of which is located a helicoid conveyer 47 mounted in suitable bearings 48, said conveyers being rotated by suitable mechanism to be hereinafter described. The forward or discharge end of the trough 45 is fitted to an approximately hemispherical hopper 49 which engages a corresponding socket 50 suspended from the deck of the cab, whereby a universal joint is provided which allows for any relative vertical or lateral movement between the cab and the tender. The rear or receiving end of the trough 45 is provided with a coal crusher which is operated from the main conveyer operating shaft. This part of the mechanism will be fully described later. The rear of the conveyer is provided with a rest or support 51 slidingly mounted upon the tender plate 52 under the shield 53 arranged within the tender beneath the fuel and provided with a feed opening 54.

The stoking mechanism proper comprises a fuel chute 55 supported from the deck plate by a suitable standard 56. This standard is preferably of tubular form to constitute a plunger guide, as will hereinafter appear. Attached to said casing is the cylinder 57 of a reciprocating engine provided with the usual steam inlets 58, 59, the piston 60 of said engine being connected, by means of a rod 61, with the stoking head 62 arranged to reciprocate within the chute 55. The said chute 55 is provided with guides 63 engaged by said stoking head, whereby the latter is prevented from rotating during its reciprocations, also to facilitate the passage of the stoking plunger over the delivery or face of the feeding mechanism. It will be observed that the chute 55 is slightly inclined to bring the discharge end 64 in proper position with relation to the fire box, also as a means of lowering the rear of the stoker to facilitate hand firing, should it become necessary.

The fuel is delivered to the chute 55 from the hopper 49 by means of an elevating head 65 mounted to reciprocate with a sleeve or guide 66, the lower end of the latter being mounted within a depending extension 67 of the socket 50. The upper end of the sleeve or guide 66 is adapted to pass through the standard 56, the head 65 serving as a closure for the bottom feed opening 68 in chute 55 when said chute has received a charge of fuel. The head 65 and its guides 66 are reciprocated by means of the piston 69 of an engine 70, said piston being connected to said head by a rod 71 as shown. The engine 70 is provided with the usual inlet pipes 72, 73.

The fuel delivered to the chute 55 is distributed by means of a rotary sleeve 74 mounted on the forward end of said chute, said sleeve being provided with an adjustable hood or deflector 75 pivotally supported at 76. Said hood or deflector is controlled by means of a lever arm 77 having rack teeth 78 in its upper edge held in normal engagement with a locking member 79 by means of a spring pressed pawl 80 engaging the under side of said arm.

When it is desired to operate the hood or deflector, the operator presses down upon the handle portion 81$^a$ of lever 77 until the teeth 78 are disengaged, whereupon said lever may be moved at will to vary the position of the hood. As soon as the downward pressure is discontinued, the pawl 80 will assert itself and automatically lock the said lever 77 and hood 75 in the new or adjusted position.

The sleeve 74 is provided with an exterior rack 81 adapted to be alternately engaged by pinions 82, 82', mounted in a pivotally supported carrier 83. A driving pinion 84 is secured to the valve shaft section 85, the same meshing directly with pinion 82, and indirectly with pinion 82', through an idler 86. The carrier is held with either of the pinions 82, 82' in engagement with the rack 81 by means of a spring pressed pawl 87 carried by a pawl carrier 88 pivotally supported at 89, and engaging notches 90, 90' in a locking member 91. Said notches are separated by a raised or cam portion 92.

The pawl carrier 88 is provided with fingers 93, 93' adapted to project respectively into the paths of movement of pins 94, 94', projecting from the outer face of the sleeve 74.

The valve shaft section 85 is normally coupled to the main valve shaft 95 of the controlling or operating valve 96 by means of the clutch 97. When desired, said shafts may be uncoupled through the medium of a suitable clutch lever 98 within convenient reach of the operator. By this arrangement, the oscillation of the sleeve 74 may be arrested at any point by merely disconnecting the clutch, whereupon the entire charge in chute 55 may be directed to any one point in the fire box. The clutch therefore becomes a selector device by means of which the operator may select any point to be fed and concentrate the delivery upon that point. The clutch lever 98 has associated therewith a suitable form of locking latch and notched locking segment 98$^a$, 98$^b$ respectively, which provide for locking the clutch either in its open or closed position. The shaft 95 receives its rotation through the medium of a ratchet lever 99 provided with a spring pressed pawl 100 engaging ratchet teeth 101 on said shaft. Said lever 99 is oscillated by reason of its connection with the links 102 of an engine or motor 103.

To the free end of the lever 99 is connected one end of a swiveled link 104, the other end thereof being connected to a crank arm 105 carried by a rock shaft 105$^a$ provided with a second crank arm 106. Said crank arm is in turn connected by means of suitable links 107 with ratchet levers 108 having spring pressed pawls 109 engaging ratchet wheels 110 secured to the shafts of conveyers 47.

Figure 37:
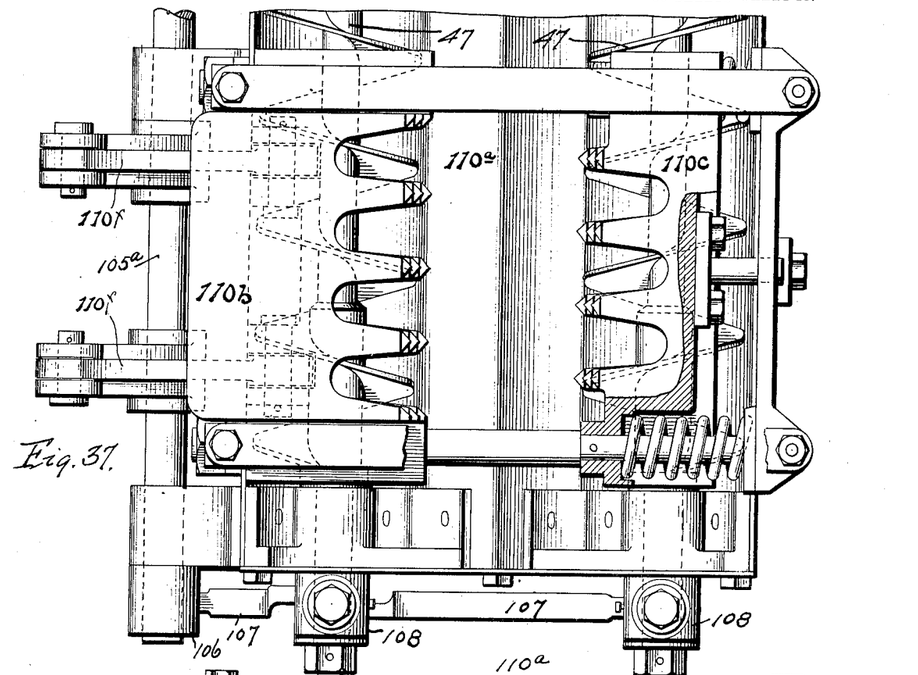
Fig. 37 is a top plan view of the coal crusher which is attached to the rear of the conveyer.
Figure 38:
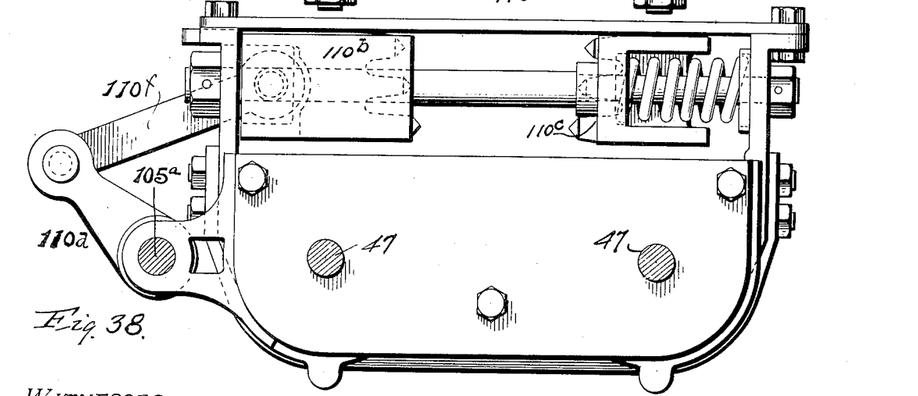
Fig. 38 is an end elevation of the crusher shown in Fig. 37.

The coal crusher attached to the rear of the conveyer shown in Fig. 37, and designated as a whole by the numeral 110$^a$ consists of a movable head 110$^b$, a stationary spring seated head 110$^c$, suitable operating levers 110$^d$ attached to the driving shaft 105$^a$ of the coal conveyer, and connecting links 110$^f$, that transmit the motion from the operating shaft to the crushing head. The driving engine operating through the arm 105 which is attached to the conveyer operating shaft at the forward end, oscillates the links 110$^d$ at each reciprocation of the engine. This oscillation gives the movable crusher head a lateral to and fro movement across the conveyer, thus not only crushing the coal, but at the same time giving a constant feed.

The stoking, and elevating or feeding engines are automatically successively and synchronously controlled from the single controlling or operating valve indicated as a whole by the numeral 96 operating in the valve chamber 96$^a$. Said valve comprises a casing provided with ports 112, 113 receiving live steam from the locomotive boiler; an outlet port 114 communicating with passage 58; exhaust ports 115, 116, communicating with pipe 59; steam port 117 communicating with pipe 73; exhaust ports 118, 119, communicating with pipe 72; exhaust ports 120, 121, communicating with passage 58ª; steam port 122 leading to passage 59ª; steam port 123 leading to pipe 72, and exhaust ports 124, 125 communicating with pipe 73. The various ports are arranged at intervals around said casing and are controlled by a bushing 126 provided with a series of ports arranged in a longitudinally extended straight line and adapted to register with the various valve ports in sequence.

Figure 1:
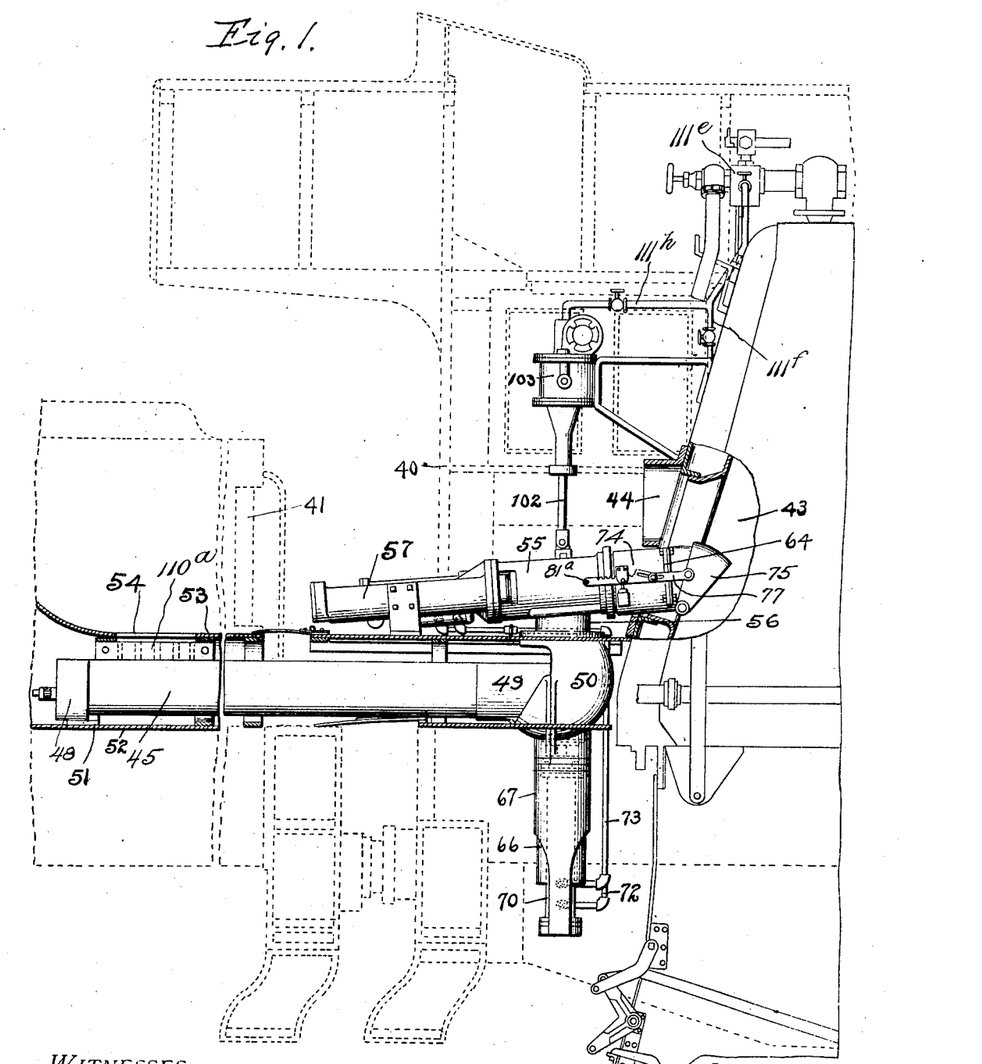
Figure 1 is a side elevation illustrating my improved mechanical stoker and its feeding mechanism, parts of the locomotive being shown in cross section; the outline of the locomotive cab and tender being illustrated in dotted lines.
Figure 2:
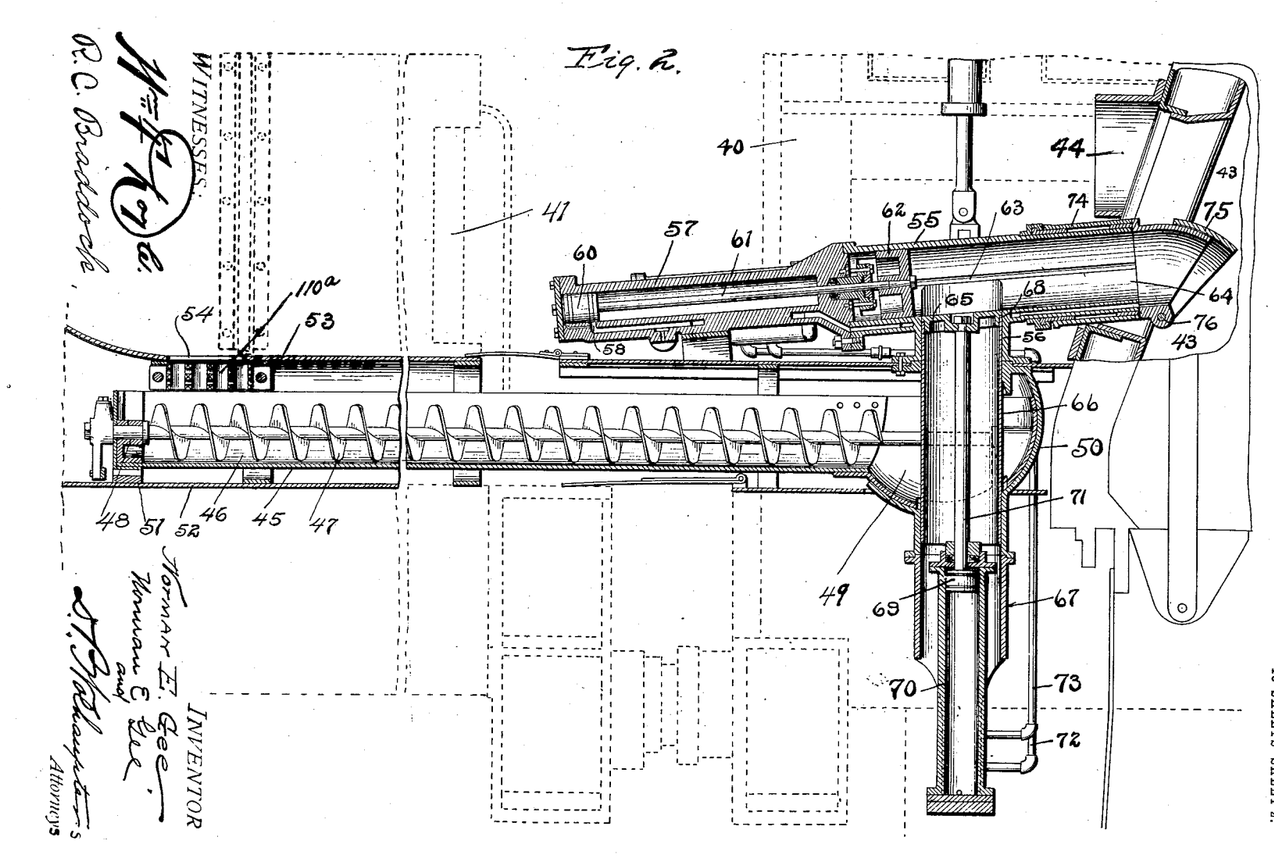
Fig. 2 is an enlarged longitudinal sectional view of the stoker and its feeding mechanism.
Figure 3:
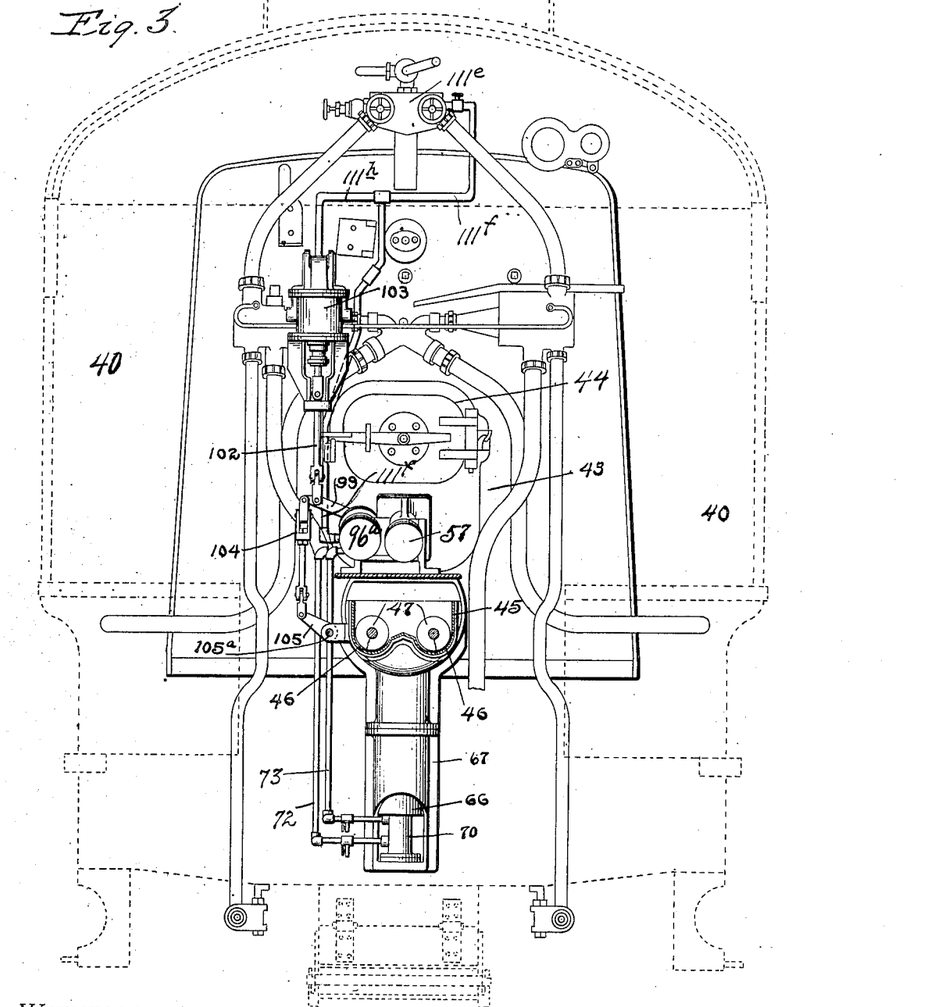
Fig. 3 is a view showing the arrangement of the stoker in the cab as viewed from the front of the tender, showing the available space in the locomotive cab above the deck plate after the stoker is put in place.
Figure 3A:
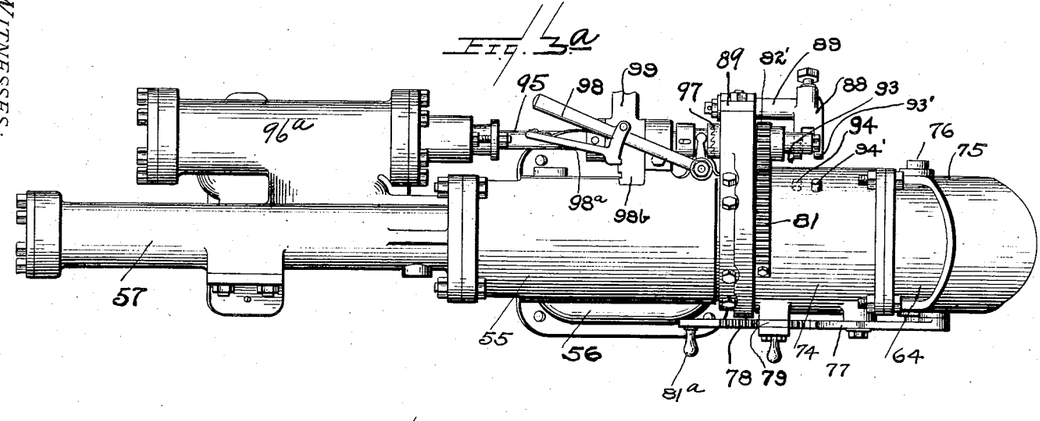
Figure 4:
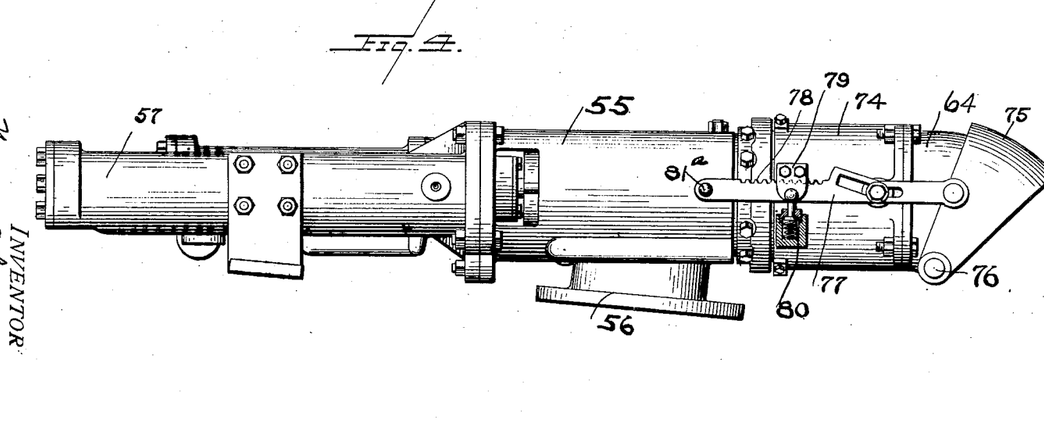
Fig. 4 is a side elevation thereof.
Figures 5, 6, 39:
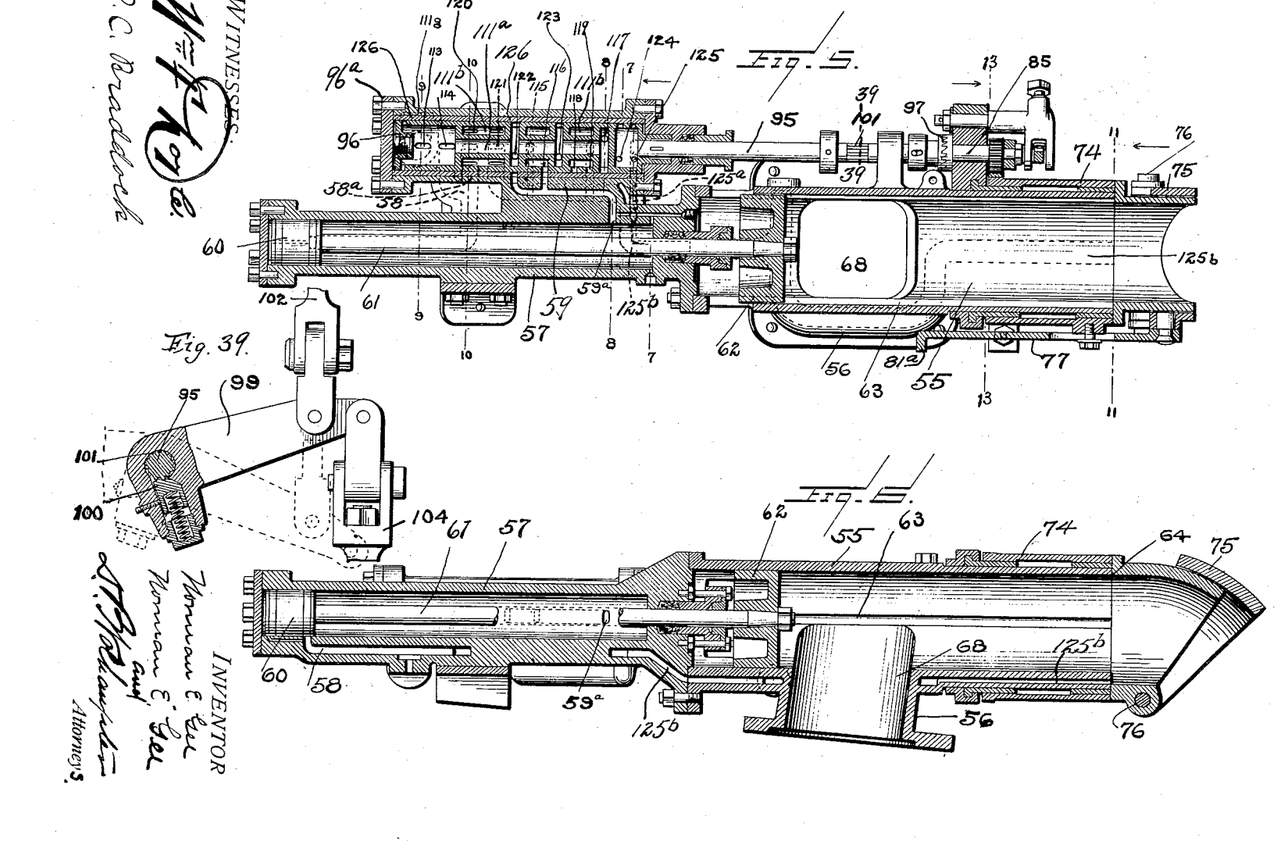
Figs. 5 and 6 are longitudinal sectional views of Figs. 3ª and 4, respectively.
Fig. 39 is a detail view of the ratchet operating connections with the main valve, the line of section being at the point 39—39 on Fig. 5.
Figure 7:
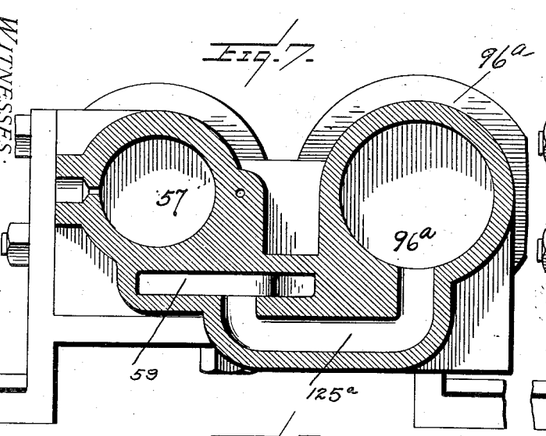
Fig. 7 is an enlarged cross sectional view on the line 7—7 of Fig. 5 looking backward.
Figure 8:
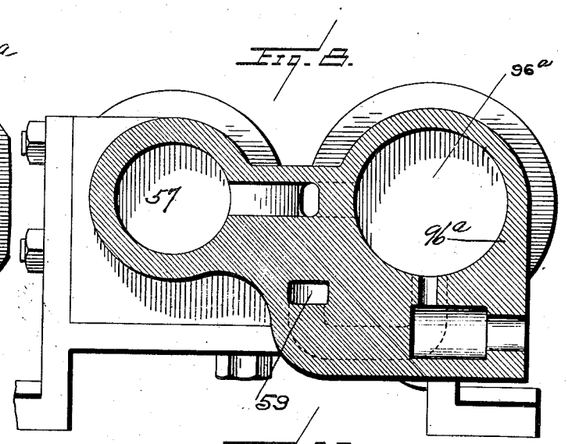
Fig. 8 is an enlarged cross sectional view on the line 8—8 of Fig. 5.
Figures 9, 10:
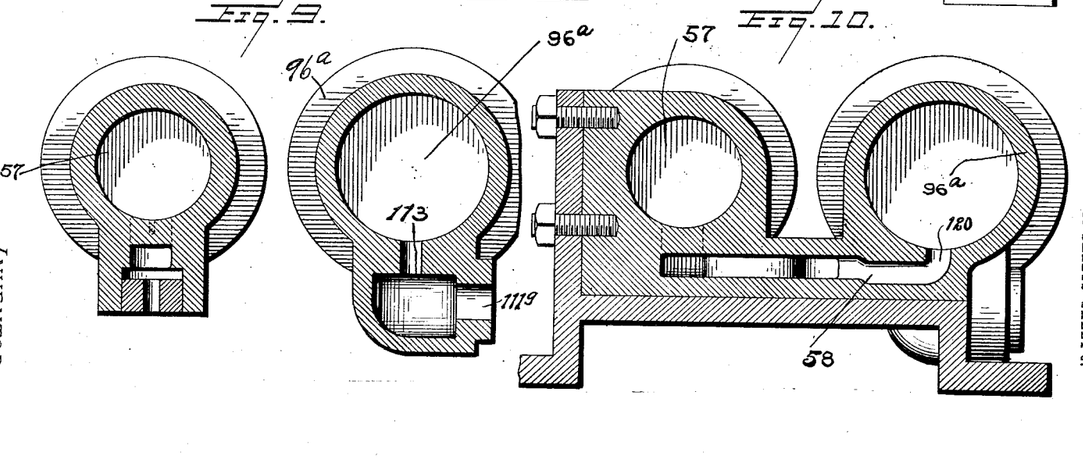
Fig. 9 is a cross sectional view on the line 9—9 of Fig. 5, showing the main steam inlet into the stoker.
Fig. 10 is a cross sectional view on the line 10—10 of Fig. 5, showing one of the main exhaust ports together with the support for the rear of the stoker, the valve and bushing removed.
Figures 11, 12, 13:
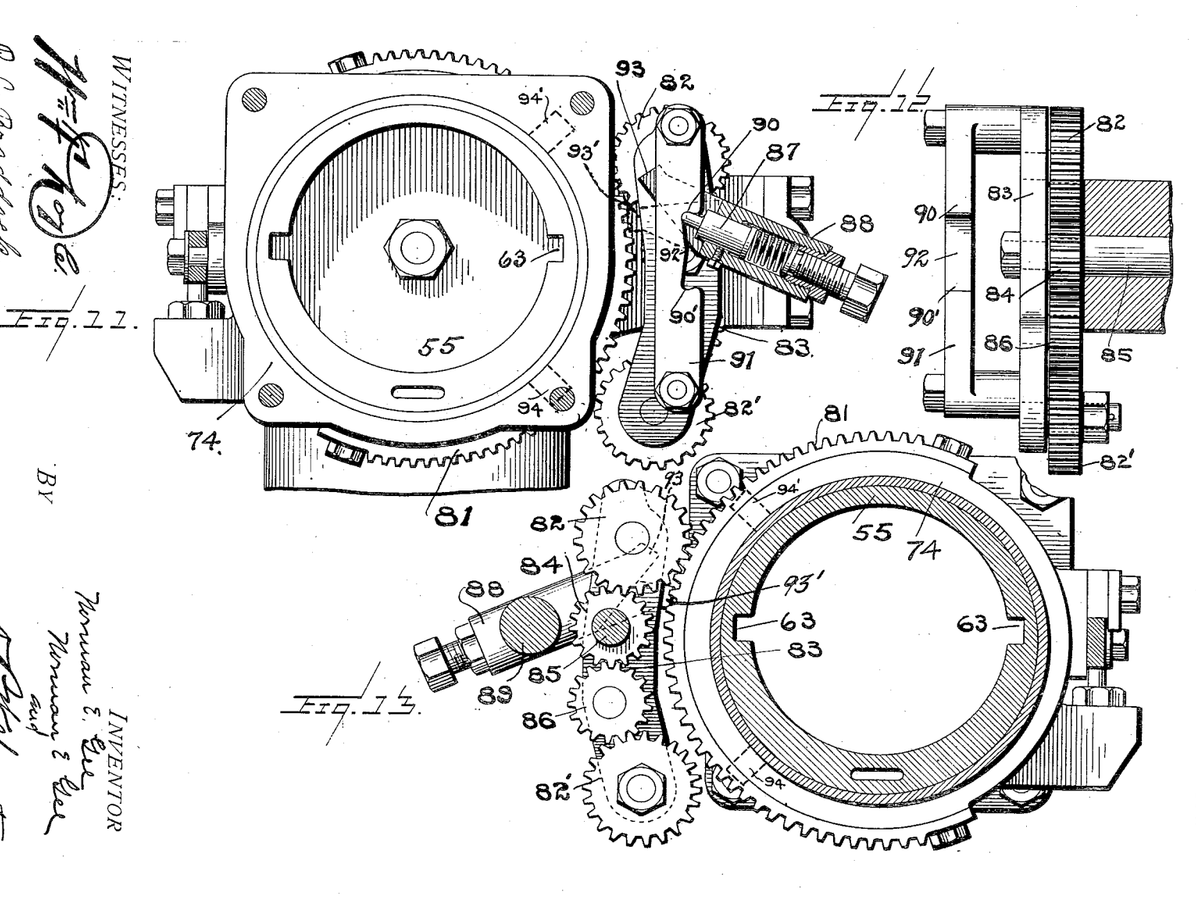
Fig. 11 is a front elevation of the stoker proper showing the stoking plunger in position together with the reversing mechanism for the distributing chute, a part of the reversing mechanism being shown in section, this section being taken on the line 11—11 of Fig. 5.
Fig. 12 is a sectional end view of the rack and gears of the reversing mechanism showing the driving rod in position.
Fig. 13 is a cross sectional view on the line 13—13 of Fig. 5.
Figure 14:
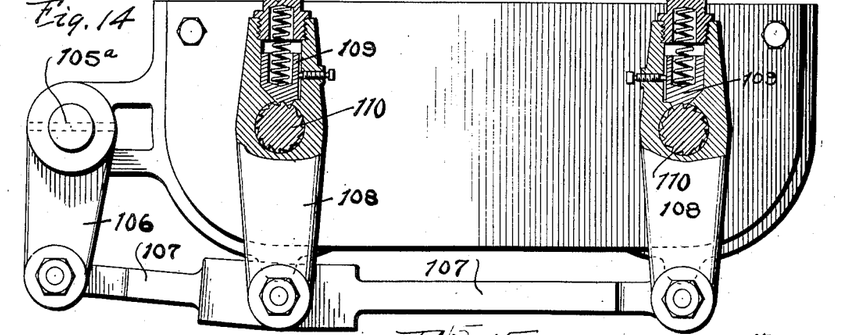
Fig. 14 is a view of the rear end of the coal conveyer showing the method of operating the right hand and left hand helicoid screw conveyers.
Figure 15:
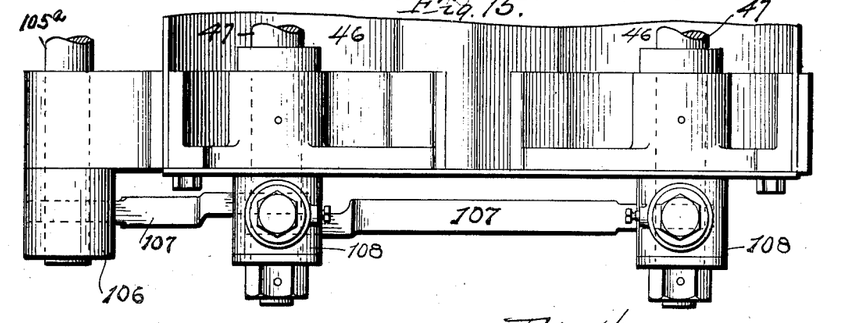
Fig. 15 is a plan view of the mechanism shown in Fig. 14.
Figure 16:
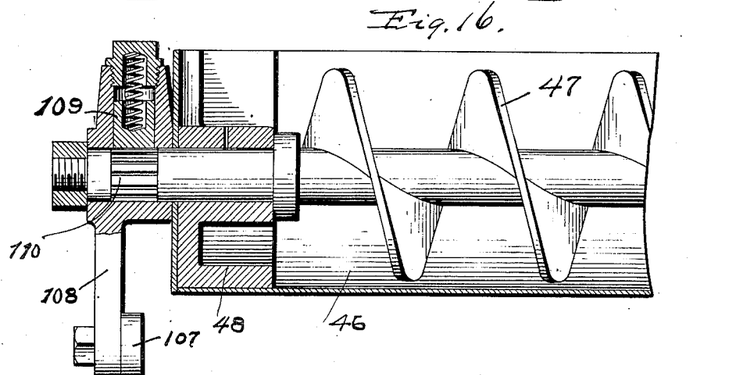
Fig. 16 is a sectional view of the coal conveyer showing one of the helicoid conveyers in position.
Figure 17:
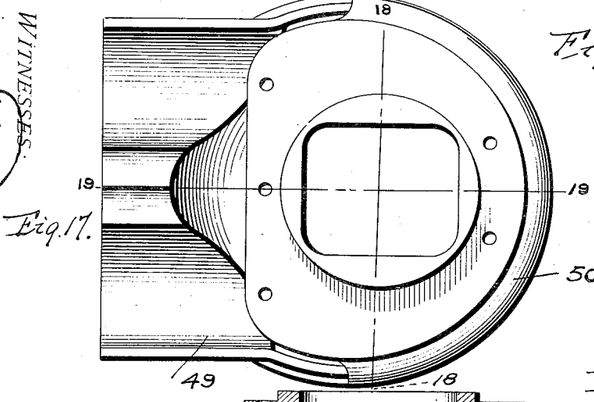
Fig. 17 is a top plan view of the fuel hopper attached to the front end of the coal conveyer.
Figure 18:
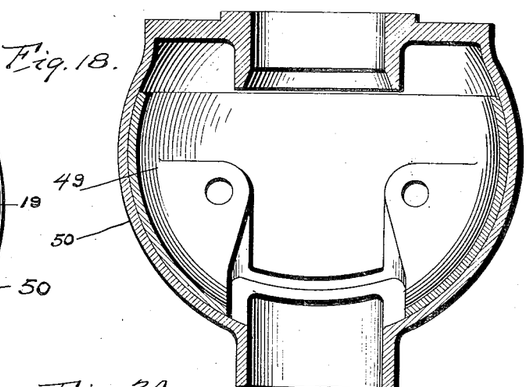
Fig. 18 is a sectional view taken on the line 18—18 of Fig. 17.
Figures 19, 20:
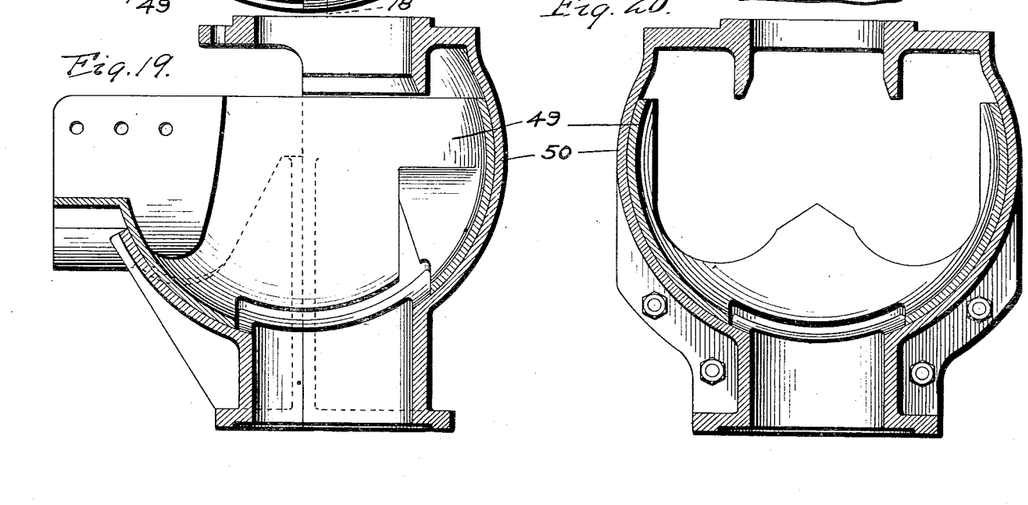
Fig. 19 is a sectional view of the hopper taken on the line 19—19 of Fig. 17.
Fig. 20 is a sectional view of the hopper taken on the line 18—18 looking back toward the conveyer attachment.
Figure 21:
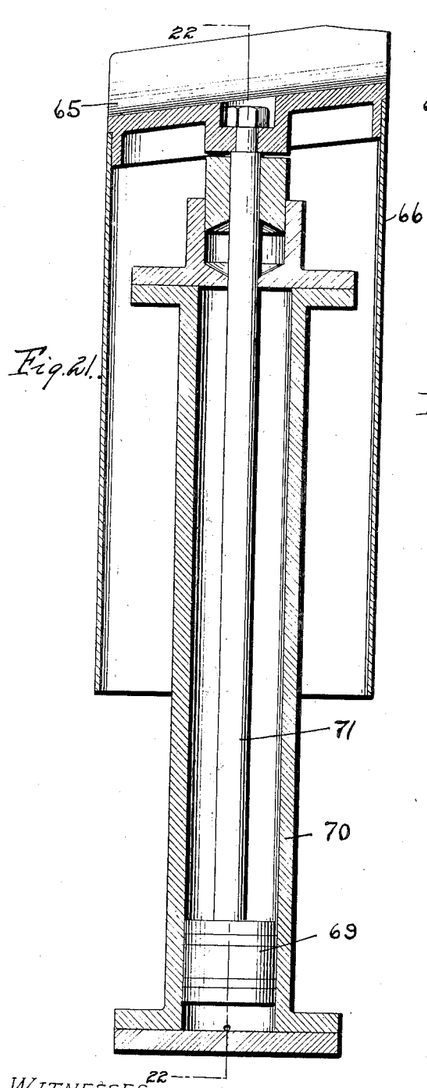
Fig. 21 is an enlarged vertical longitudinal sectional view of the fuel elevating mechanism on the same line of section as in Fig. 2 and showing the elevating head 65 lowered.
Figure 22:
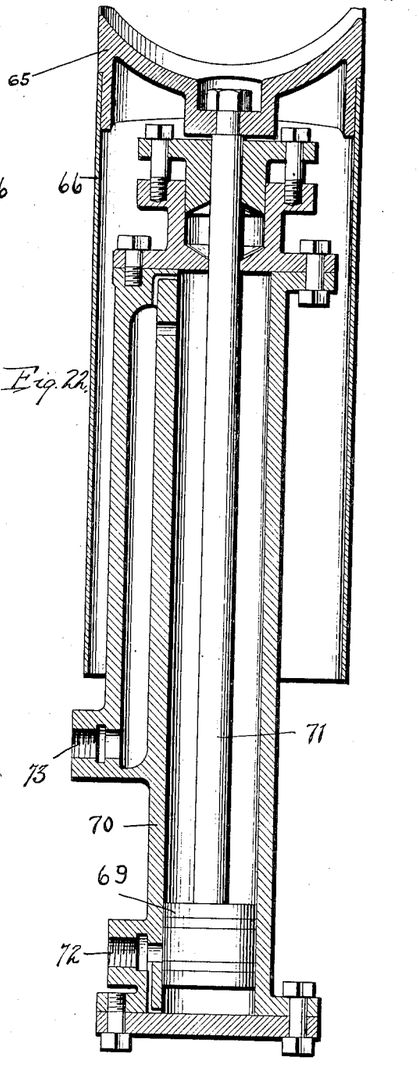
Fig. 22 is a similar sectional view of the elevating mechanism on the line 22—22 of Fig. 21.
Figure 23:
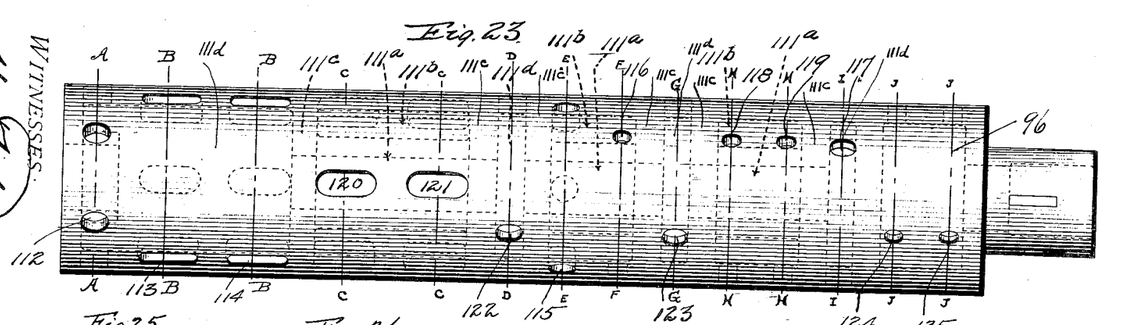
Fig. 23 is a view illustrating the controlling valve.
Figures 24, 25, 26, 27, 30, 31, 32:
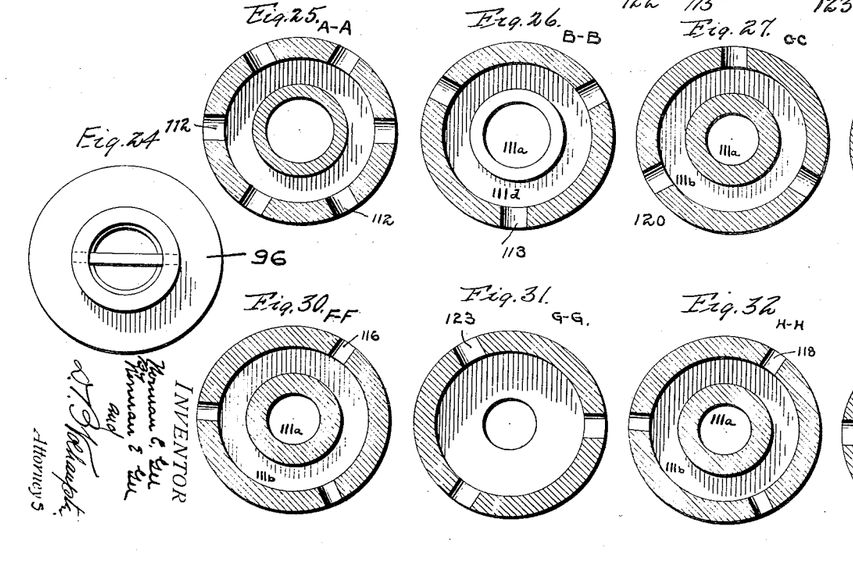
Fig. 24 is a front end view thereof.
Fig. 25 is a section on line A—A, Fig. 23.
Fig. 26 is a section on line B—B, Fig. 23.
Fig. 27 is a section on line C—C, Fig. 23.
Fig. 30 is a section on line F—F, Fig. 23.
Fig. 31 is a section on line G—G, Fig. 23.
Fig. 32 is a section on line H—H, Fig. 23.
Figures 28, 29:
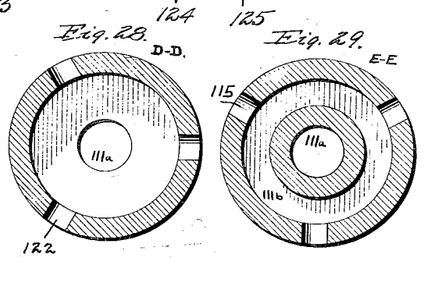
Fig. 28 is a section on line D—D, Fig. 23.
Fig. 29 is a section on line E—E, Fig. 23.
Figure 33:
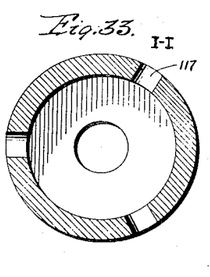
Fig. 33 is a section on line I—I, Fig. 23.
Figure 34:
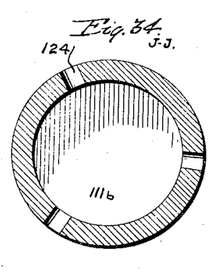
Fig. 34 is a section on line J—J, Fig. 23.
Figure 35:
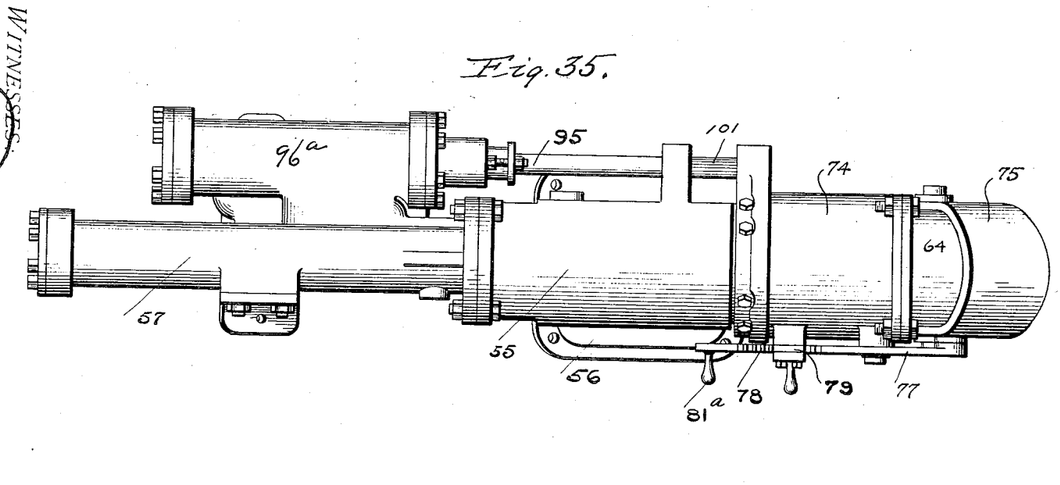
Fig. 35 is a top plan view of the stoking mechanism proper showing the arrangement of parts when the fuel distributing mechanism is operated by the fireman and not automatic as illustrated in Fig. 3ª.
Figure 36:
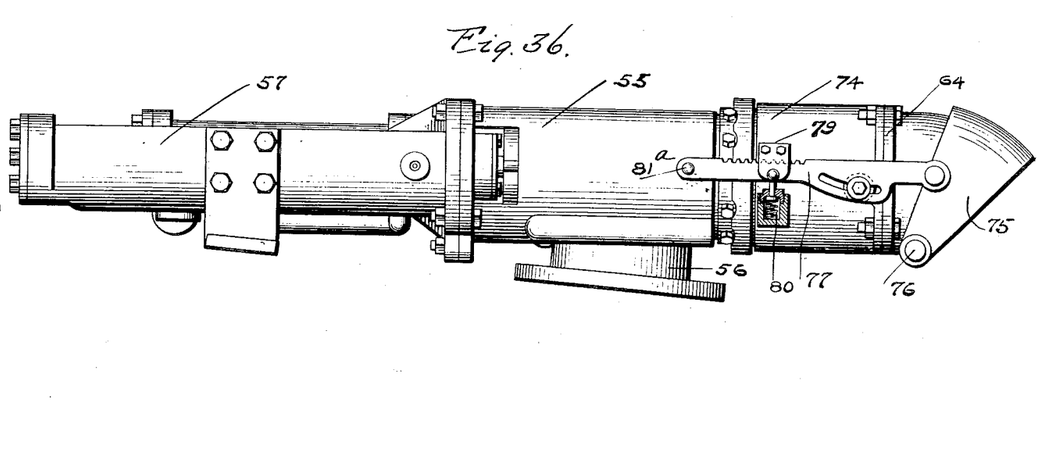
Fig. 36 is a side elevation of the stoking mechanism shown in Fig. 35.

The operating valve is of the rotary type, circular in section and comprises a source of steam and exhaust ports arranged at intervals throughout its length. The valve also comprises means for conveying live steam through the exhaust steam passages as indicated by the opening 111ª which is shown cored through the exhaust openings 111ᵇ, through the bridges 111ᶜ, thus connecting the live steam cavities 111ᵈ in the valve, with each other and with the live steam pressure of the locomotive boiler. The steam from the locomotive bridge pipe 111ᵉ is conveyed through pipe 111ᶠ down to the rear of the stoker and enters the valve chamber at opening 111ᵍ, shown in Fig. 9. Steam from the locomotive bridge pipe is also conveyed to the driving engine 103 through the branch pipe 111ʰ. The steam entering the valve through the chamber fills all the live steam cavities therein and is ready to be released at the first downward stroke of the driving engine. Steam being admitted to engine or motor 103 through the branch pipe 111ʰ, the engine is made to reciprocate, thus setting the conveyers 47 in operation by virtue of the spring pressed pawl 109, engaging the teeth 110, which are cut on the conveyer shaft extension which is supported in bearing 48.

It will be noted that the ratchets 109, 109 are reversely arranged, thereby providing for the turning of both conveyers toward the center of the double trough 45, thus preventing the fuel from spilling over the edges of said trough and also avoiding the clogging of the feed. The reciprocation of the engine 103 moves the helicoid conveyers alternately, causing fuel to be discharged into the hopper 49 from whence it is elevated by head 65 and delivered into the chute 55. In this connection it should be observed that the ratchet means for transmitting motion to the main conveyer or conveyers provides for a regular but intermittent movement of the latter, whereby the fuel received from the combined crushing and feeding device is not only evenly and regularly advanced toward the locomotive fire box in such measured movements as to provide a constant regulated supply without overfeeding, but is also maintained by the main conveyer or conveyers in a substantially divided or separated condition, so that packing or clogging is avoided and increments or charges of fuel may be delivered by the elevating means into the receiving chamber or chute from whence the increments or charges are expelled into the fire box by an intermittently-acting discharging device or piston, all of which instrumentalities are synchronized so as to properly operate in time and are controllable from and operated by the same prime operating means.

Assuming that the engine 103 is operating and coal has been placed in the hopper 49, in the manner explained, and that the steam port 123 in the valve 96 is open through pipe 72 to the bottom of piston 69 in cylinder 70. The piston will be forced up communicating its motion through the rod 71 to the feeding plunger 65 which will pass up through the coal deposited in the hopper 49 and remove a quantity or increment of the same and deliver it to the chute 55 to be forced into the fire box of the locomotive by the stoking head 62. When steam is admitted through pipe 72 to the bottom of cylinder 70 the exhaust steam from the top of the piston passes out the pipe 73, back into the valve 96 at ports 124, and out at port 125 through the cored passage 125ª, which communicates with the main exhaust 125ᵇ which leads into the fire box of the locomotive. The feeding plunger having delivered its charge or increment of fuel to the chute 55, the rotation of the valve 96 through 30° by a downward stroke of the driving engine 103, will bring port 114 of the valve in open communication through the valve bushing with passage 58 which leads to the rear of the stroking cylinder 60. This piston then rushes forward driving the stoking plunger 62 over the top of the feeding plunger 65 and taking the increment of fuel there held through the distributing sleeve 74 into the fire box of the locomotive, which stoking operation is assisted by the sweeping effect of the steam jet issuing through the passage or port 125ᵇ. When port 114 is open for live steam to the rear of piston 60 the exhaust steam in front of the piston passes out of the cylinder synchronously at passage 59ª which leads to the valve and enters at port 116 and leaves at port 115, enters the passage which leads to the main exhaust 125ᵇ which is extended into the fire box. The coal having been delivered to the fire box of the locomotive, the next step is to retract the feeding plunger for the purpose of obtaining more fuel. The rotation of the valve 30° by another downward stroke of the driving engine will bring port 117 in the valve 96 in direct communication with pipe 73 which leads directly to the top of the feeding cylinder piston 69, thus forcing the piston down with the plunger 65 and its shield 66. When steam is admitted to the top of the piston the steam previously admitted below the piston to drive the same upwardly delivering the coal, is synchronously exhausted back through the pipe 72 to the valve 96 at port 118, out of the valve at port 119 through a cored passage to the main exhaust which leads into the fire box. This feeding plunger 65 now being down at its initial position and covered with fuel, the stoking head 62 must be next retracted. The continued rotation of the valve brings steam port 122 in direct line for live steam admission from the boiler through the passage 59$^a$ at the front of the stoking piston 60, which moves back, uncovering the opening 69, through which fuel is forced to chute 55.

When port 122 is open for live steam from the boiler the exhaust steam at the rear of the piston is conveyed back synchronously through passage 58$^a$, to the port 120 in the valve, enters the valve and leaves for the main exhaust through port 121 from whence it is conveyed to the fire box. Another downward stroke of the driving engine 103 will bring port 123 in line with pipe 72 and live steam will enter the feeding cylinder from below and the plunger will be forced up, placing coal in chute 55 in front of the stoking head 62. The operations are continued in the manner and order described as long as the driving engine is in operation and the steam pressure from the boiler is in direct communication with the inside of valve 96. In these repeated operations it will have been observed from the foregoing description that by reason of the particular arrangement of the crushing device and the horizontal movement thereof beneath the gravity discharge passage in the bottom of the tender, the reciprocating member of the crusher necessarily performs both the functions of crushing and feeding, and constitutes a gate or partial gate below the gravity discharge passage in the tender. As stated, this horizontally moving crushing device is a part of the conveying mechanism, being operated from the same line of operating connections, but timed therewith to provide for maintaining a constant supply of fuel into the receiving end of the conveyer trough or chute. At this receiving end of the conveyer trough or chute, the conveyer is continued beneath the crusher or crushing piston, so that the receiving end of the conveyer itself necessarily gives the fuel its preliminary forward movement in the chute or trough away from the crusher and feeder, while the main portion of the conveyer in advance of the crushing device forward the fuel to the front end of the chute from whence it is delivered by increments or separate charges into the receiving chamber of the stoking device to be expelled into the fire box.

At the time the fuel is being discharged the sleeve 74 is being oscillated in the manner heretofore described. The discharge end 64 of said sleeve serving to direct the fuel laterally as well as centrally according to the stage of the oscillation of said sleeve. The direction of discharge is further controlled by means of the hood or deflector 75 which may be manipulated at the will of the fireman or the operator. Should it become necessary to concentrate the entire charge of fuel in one place in the fire box, the shaft 85 is unclutched from shaft 95, whereupon sleeve 74 will remain stationary, and the fuel will thereupon be delivered to the point selected, and the automatic action will be resumed as soon as the shafts are connected through the medium of the clutch.

I claim:

1. In an apparatus for supplying fuel to a locomotive fire box, in combination with the locomotive fire box and the tender having a gravity discharge passage, a stoking device including means for forcing the fuel into the fire box, and a fuel handling system including a combined crushing and feeding device arranged at said discharge passage, an advancing conveyer arranged in position to receive the fuel from said crushing and feeding device and comprising means for advancing it toward the fire box in a substantially divided state, and means for transferring separate charges of fuel from the advancing conveyer to the said stoking device, said means being timed in operation to the movements of the advancing conveyer and of the stoking device.

2. In an apparatus for supplying fuel to a locomotive fire box, the combination with the cab and deck plate, and a tender provided with a gravity discharge passage, of a stoking device disposed above the deck plate and including means for forcing the fuel over the fire, and a fuel-handling system disposed below both the deck plate and the tender, and including a combined crushing and feeding device arranged and operating at said gravity discharge passage, a conveyer operated synchronously with said device and extending forwardly therefrom, and means, operating in time with the stoking device and conveyer, for transferring separate charges of fuel from the latter to the stoking device.

3. In an apparatus for supplying fuel to a locomotive fire box, the combination of a tender provided with a discharge passage, a stoking chute, intermittently-acting discharging means for forcibly expelling separate charges of fuel from the chute over the fire, and a fuel feeding mechanism arranged below the chute and receiving the fuel from the discharge passage of the tender, said mechanism including means for intermittently introducing separate charges of fuel into the stoking chute in synchronism with the operation of the said discharging means.

4. In an apparatus for supplying fuel to a locomotive fire box, in combination with a locomotive cab and its deck plate, and the tender provided with a gravity discharge passage, a stoking device disposed above the deck plate and including intermittently-acting means for discharging the fuel over the fire into the fire box, and a fuel handling system including a combined crushing and feeding device operating across and beneath the discharge passage of the tender, an intermittently operating main conveyer receiving the fuel from said crushing and feeding device, and comprising means for advancing the fuel in a substantially divided state and having operating connections with said device, and intermittently-acting fuel elevating means arranged to elevate separate charges of fuel from the main conveyer through the deck plate and to deliver the same into said stoking device in synchronous operation with said intermittently-acting discharging means thereof.

5. In a mechanical stoker, a stoking chute, a stoking head mounted to reciprocate therein, and a fuel feeding mechanism arranged below the chute and comprising means for introducing fuel at the bottom thereof and into the path of movement of the stoking head in advance of the forward movement of the latter.

6. In a mechanical stoker, a stoking chute, a stoking head mounted to reciprocate therein, an elevating head for supplying fuel to said chute from a point below the same, separate engines for operating said heads, and a valve mechanism comprising means for automatically effecting an alternate operation of said engines to lift the elevating head in advance of the forward movement of the stoking head.

7. In a mechanical stoker, a stoking chute, a stoking head mounted to reciprocate therein, an elevating head for supplying fuel to said chute from a point below the same, engines for operating said heads, a valve mechanism controlling both of said engines and provided with means for effecting an alternate operation of said engines to lift the elevating head in advance of the forward stroke of the stoking head and means for intermittently operating said valve mechanism.

8. In a mechanical stoker, a stoking chute, a stoking head mounted to reciprocate therein, an elevating head for supplying fuel to said chute from a point below the same, said elevating head forming a closure for said stoking chute, and means for operating said heads in time to lift the elevating head in advance of the forward movement of the stoking head.

9. A locomotive stoker comprising a stoking chute, a stoking head working in the chute, a conveyer, a crusher arranged at the receiving end of the conveyer, a combined hopper and universal joint located at and forming the discharge end of the conveyer, and a fuel elevator operating through the hopper and arranged to lift the fuel into the chute at the under side thereof.

10. In a mechanical stoker, the combination with a locomotive cab and tender, of a stoking chute, a conveyer adapted to span the space between the locomotive cab and tender and provided at its discharging end with an enlargement forming a rounded hopper, a hollow support in communication with the chute and having a rounded member in which is loosely seated said hopper to form a universal joint at this point, and means for automatically elevating fuel from said hopper and through said support into said chute.

11. A mechanical stoker comprising a fuel feed mechanism, an elevating mechanism, a stoking mechanism, a valve controlling said elevating and stoking mechanisms and a single motor for operating said valve, and said feed mechanism.

12. A mechanical stoker comprising a feed mechanism, an elevating mechanism, a stoking mechanism including a distributing device, a single valve controlling the operating of said elevating and stoking mechanism, and a single motor for operating said valve, said distributing device, and said feed mechanism.

13. A mechanical stoker comprising a feed mechanism, an elevating mechanism, a stoking mechanism, a rotatable valve for controlling the operation of said stoking and elevating mechanism, ratchet levers adapted to operate said valve and said feed mechanism, and a single motor for oscillating said levers.

14. A mechanical stoker comprising a stoking mechanism including a chute, a distributing sleeve, a fuel feeding mechanism including an elevating device for lifting fuel into the chute, a shaft operating said sleeve, a common controlling valve having a releasable connection with said shaft and comprising means for controlling both the stoking and fuel elevating means, a single motor for operating both said shaft and the fuel feed mechanism.

15. In a locomotive stoker, a stoking chute, an oscillating discharge sleeve swiveled thereon, a manually controlled hood or deflector mounted on said sleeve at the discharging end thereof, an adjustable fastening device for securing the hood or deflector in different set positions, a power shaft geared with said sleeve, a device for reversing the direction of movement of said sleeve, and means for automatically actuating said device by the movement of the sleeve.

16. In a mechanical stoker, a stoking chute, a discharge sleeve swiveled thereto, and provided with a toothed rack, a power shaft, forward and reverse pinions geared to said shaft, and automatic means for alternately throwing said pinions into mesh with said rack.

17. In a mechanical stoker, a stoking chute, a discharge sleeve swiveled thereto and provided with a toothed rack, a power shaft, a frame pivotally mounted on said shaft, forward and reverse pinions carried by said frame and meshing with said shaft, a spring pressed pawl holding said frame normally from movement, and means for automatically moving said pawl to shift said frame, whereby said pinions are alternately thrown into mesh with said rack.

18. In a mechanical stoker, a stoking chute, a discharge sleeve swiveled thereto and provided with a toothed rack, a power shaft, a frame pivotally mounted on said shaft, forward and reverse pinions carried by said frame and meshing with said shaft, a spring pressed pawl holding said frame from movement, said pawl being provided with diverging arms, and means carried by said sleeve for alternately engaging one or the other of said arms, whereby said frame is rocked to bring said forward and reverse pinions alternately into engagement with said rack.

19. In a mechanical stoker, a stoking chute, a discharge sleeve swiveled thereto, a power shaft geared with said sleeve, means for intermittently rotating said shaft, a motion reversing device for the sleeve, and means for actuating said device from the sleeve.

20. In a mechanical stoker, a stoking mechanism provided with a distributer, a valve controlling said stoking mechanism, means for automatically and simultaneously operating said valve and said distributer, and means for disconnecting said distributer whereby the same is brought to rest during the continued operation of said valve.

21. In a mechanical stoker, stoking mechanism including a stoking chute, a distributing sleeve mounted on one end of the chute, a valve controlling said stoking mechanism, an operating shaft for said valve, a shaft section normally connected with said shaft, a reversing device associated with said shaft section, and means for automatically actuating the reversing device from the sleeve.

22. In a mechanical stoker, stoking mechanism including a stoking chute, a distributing sleeve mounted thereon, a valve controlling said stoking mechanism, an operating shaft for said valve, a shaft section for operating said sleeve normally connected with said shaft, and means for disconnecting said shaft section from said shaft.

In testimony whereof I hereunto affix my signature in the presence of two witnesses.

NORMAN E. GEE.

Witnesses:
  ROBERT CRAINE,
  KATE M. BROWN.